(12) United States Patent
Yip

(10) Patent No.: US 10,467,817 B1
(45) Date of Patent: Nov. 5, 2019

(54) USER DEVICE AUGMENTED REALITY VIRTUAL ITEM MODELING

(71) Applicant: Houzz, Inc., Palo Alto, CA (US)

(72) Inventor: Aaron Yip, Palo Alto, CA (US)

(73) Assignee: Houzz, Inc., Palo Alto, CA (US)

( * ) Notice: Subject to any disclaimer, the term of this patent is extended or adjusted under 35 U.S.C. 154(b) by 0 days.

(21) Appl. No.: 15/959,722

(22) Filed: Apr. 23, 2018

(51) Int. Cl.
  *G06T 19/00* (2011.01)
  *G06T 15/00* (2011.01)
  *G06F 3/0481* (2013.01)

(52) U.S. Cl.
  CPC ........ *G06T 19/006* (2013.01); *G06F 3/04815* (2013.01); *G06T 15/005* (2013.01); *G06T 2207/20081* (2013.01); *G06T 2207/20084* (2013.01)

(58) Field of Classification Search
  None
  See application file for complete search history.

(56) References Cited

U.S. PATENT DOCUMENTS

| | | | | |
|---|---|---|---|---|
| 9,965,793 | B1 * | 5/2018 | Hasan | G06F 16/951 |
| 10,192,115 | B1 * | 1/2019 | Sheffield | G06N 20/00 |

* cited by examiner

*Primary Examiner* — Jeffrey J Chow
(74) *Attorney, Agent, or Firm* — Schwegman Lundberg & Woessner, P.A.

(57) ABSTRACT

Disclosed are various embodiments for simulating one or more virtual objects (e.g., renders) in specified spatial areas of a real-world environment. Options of item models for modeling in a given spatial area can be filtered based on specified dimensions and identified features of an image of a given spatial area. A selected item model can be rendered and continuously updated on a display device as the client device is physical moved.

17 Claims, 18 Drawing Sheets

US 10,467,817 B1

USER DEVICE AUGMENTED REALITY VIRTUAL ITEM MODELING

TECHNICAL FIELD

The present disclosure generally relates to machines configured to the technical field of special-purpose machines that perform computer simulations and improvements to such variants, and to the technologies by which such special-purpose machines become improved compared to other special-purpose machines for modeling items in environments.

BACKGROUND

Client devices can be used to view a live video feed of the surrounding environment. Items (e.g., a chair) can be simulated in the live video feed by overlaying an image or 3D model of the item over the live video feed. While the mobility of some client devices, such as smartphones and tablets, allow the user to move about and view live video feed of different areas, the client devices often have limited screen sizes and input/output controls. These limitations create poor user experience because a user must often select menu within menu or navigate multiple user interfaces to simulate items. Further, many client devices have a limited amount of memory and storing model data of all models is not practical.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned, using a client device to simulate a model of an item can be difficult to the limitations of the client device (e.g., limited memory, limited network bandwidth, limited screen size, limited input/output controls). To this end, a spatial scene modeler can efficiently present items for modeling in a live video feed using a client device. In some example embodiments, a user uses his/her client device to view a live video feed of an area in which the user seeks to model an item. The user can generate a virtual frame or shape that delineates an area in which the user seeks to model items. Three-dimensional item models that fit the generated virtual frame can be requested from a network server. The user interface that presents the items that fit the virtual frame can be organized based on machine learning analysis of features of the live video feed. For example, the spatial scene model can use a convolutional neural network to determine that the client device is outside (e.g., on a patio on a sunny day), thus only items in an outside category that fit the virtual frame should be displayed as options to the user. The user can select a given model and a modeling engine can render a depiction of the item within the virtual frame. For example, if the client device is outside and patio furniture items are displayed as search results, a user can select a table, which can then be modeled in front of the client device in a live video feed (e.g., live view augmented reality), as discussed in further detail below.

Figure 1:
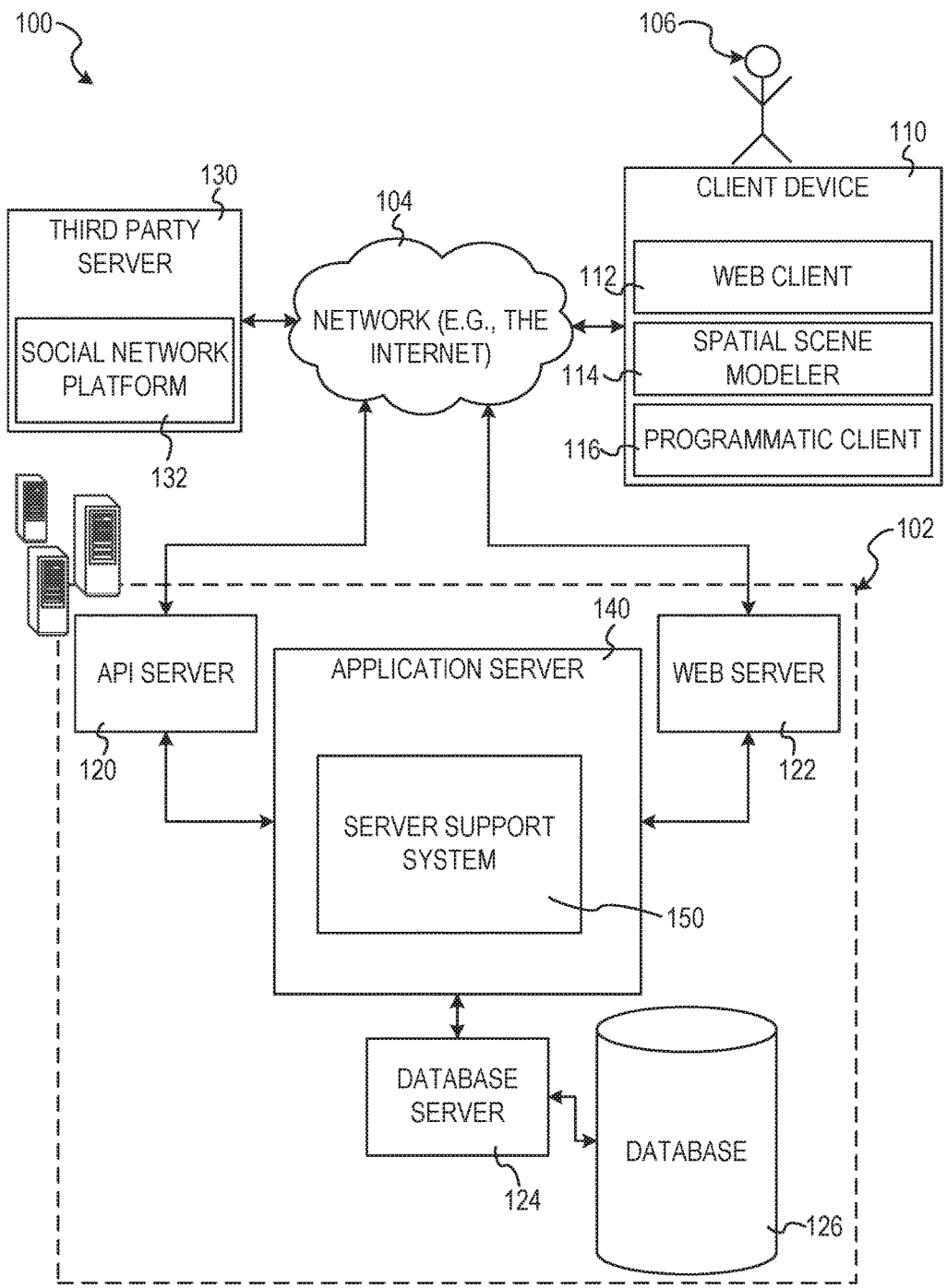
FIG. 1 is a block diagram illustrating a networked system, according to some example embodiments.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), applications such as a spatial scene modeler 114, and a programmatic client 116 executing on the client device 110. The client device 110 includes the web client 112, the spatial scene modeler 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultra-book, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps. In some implementations, the spatial scene modeler 114 includes various components operable to display a simulation of an item selected by user 106 on a vertical plane of a room in which the user 106 is located.

The web client 112 accesses the various systems of the networked system 102 via the web interface supported by a web server 122. Similarly, the programmatic client 116 and spatial scene modeler 114 accesses the various services and functions provided by the networked system 102 via the programmatic interface provided by an Application Program Interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, an application server 140. The application server 140 can host a server support system 150, which can provide content (e.g., items for three-dimensional simulation) to the client device 110, according to some example embodiments. The application server 140 is, in turn, shown to be coupled to a database server 124 that facilitates access to one or more information storage repositories, such as database 126. In an example embodiment, the database 126 comprises one or more storage devices that store information (e.g., item catalog data, 3D model data) to be accessed by server support system 150 or client device 110. Additionally, a third-party application 132, executing on third party server 130, is shown as having programmatic access to the networked system 102 via the programmatic interface provided by the API server 120. For example, the third-party application 132, utilizing information retrieved from the networked system 102, supports one or more features or functions on a website hosted by the third party.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server 140 can also be implemented as standalone software programs, which do not necessarily have networking capabilities.

Figure 2:
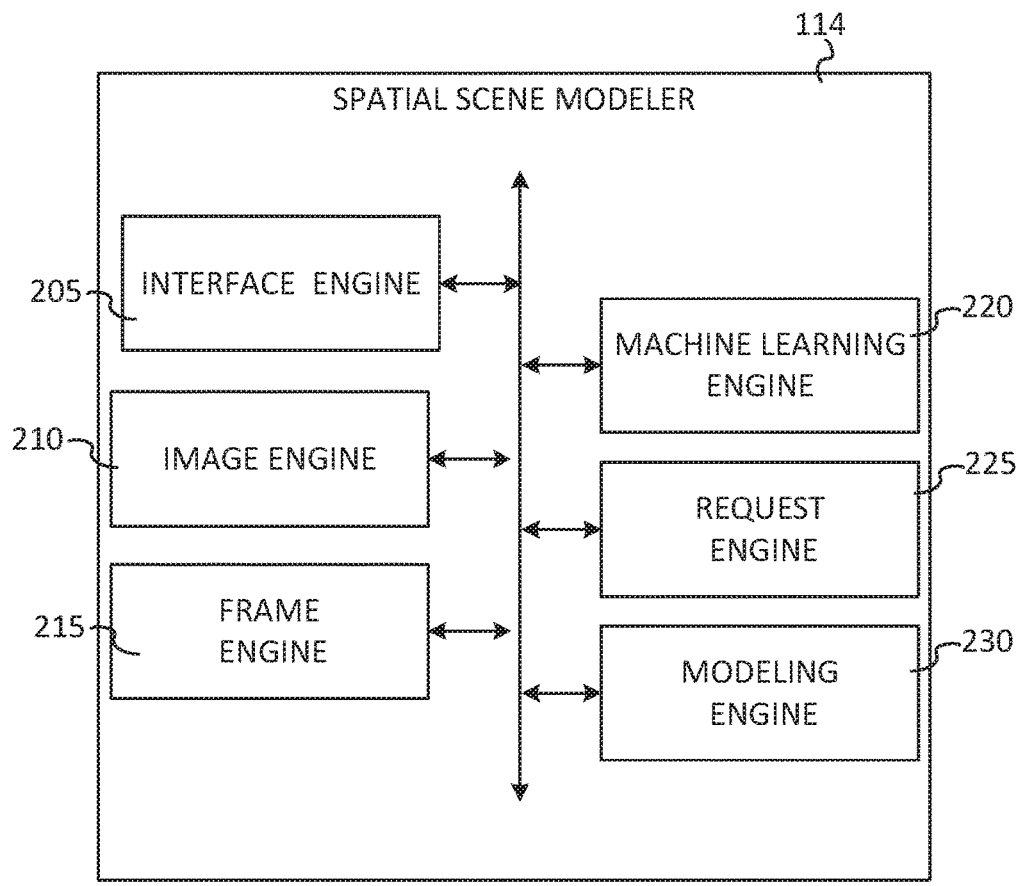
FIG. 2 shows example internal functional components of a spatial scene modeler, according to some example embodiments.

FIG. 2 shows example internal functional components of a spatial scene modeler 114, according to some example embodiments. As illustrated, the spatial scene modeler 114 comprises an interface engine 205, an image engine 210, a frame engine 215, a machine learning engine 220, a request engine 225, and a modeling engine 230. The interface engine 205 is configured to generate user interfaces that display categories of items that can be modeled within an image or video sequence on the client device 110. The image engine 210 is configured to generate an image or sequence of images (e.g. video) using an image sensor of the client device 110.

The frame engine 215 manages generating a virtual frame having one or more dimensions of specified lengths by receiving inputs from the user 106 made through the client device 110, according to some example embodiments. The frame engine 215 is further configured track the location of image features within images generated by the image engine 210 as the client device 110 is physical moved. As the location of the image features change the frame engine 215 moves a virtual camera a corresponding amount so that any models rendered using the virtual camera are viewed from the perspective of the client device 110.

The machine learning engine 220 is configured to train and implement one or more machine learning schemes (e.g., a convolutional neural network, a support vector machine, random forest) implementing the machine learning schemes to generate classification data. For example, the machine learning engine 220 can be configured to train a first convolutional neural network (CNN) to identify an image feature in an image as a coffee cup or lamp, for example. The machine learning engine 220 can further be configured to train a second convolutional neural network to identify real-world environments that a given image is depicting, according to some example embodiments. For example, the second convolutional neural network can receive an image of a real-world environment and output a first likelihood (e.g., probability) that the depicted real-world environment is an outside patio, a second likelihood that the depicted real-world environment is a kitchen, and so on. In some example embodiments, each likelihood that a given image is of a given real-word environment is accompanied by a confidence score that describes the confidence in the likelihood.

The request engine 225 is configured to generate a network communication requesting three-dimensional model data from a server. For example, the request engine 225 can be configured to send a request to the server support system 150 for 3D models of items that have real-world dimensions that fit within the virtual frame generated by the frame engine 215. In some example embodiments, the request generated by the request engine 225 further specifies that the models to be returned should be in one or more specified categories according to data generated by the machine learning engine 220, as discussed in further detail below.

The modeling engine 230 manages a virtual three-dimensional modeling environment in which one of the models received from the server support system 150 can be rendered for display within the images generated by the image engine 210, as discussed in further detail below.

Although the functional engines of spatial scene modeler 114 are illustrated in the example of FIG. 2 as being integrated into the client device 110, in some example embodiments, one or more of the engines can execute on the server 140 (e.g., in server support system 150) while other engines execute on the client device 110 (e.g., in the spatial scene modeler). For example, the machine learning engine 220 may be executed on the application server 220 to provide scene or object classification data that can modify item search results, as discussed in further detail below with reference to FIG. 3.

Figure 3:
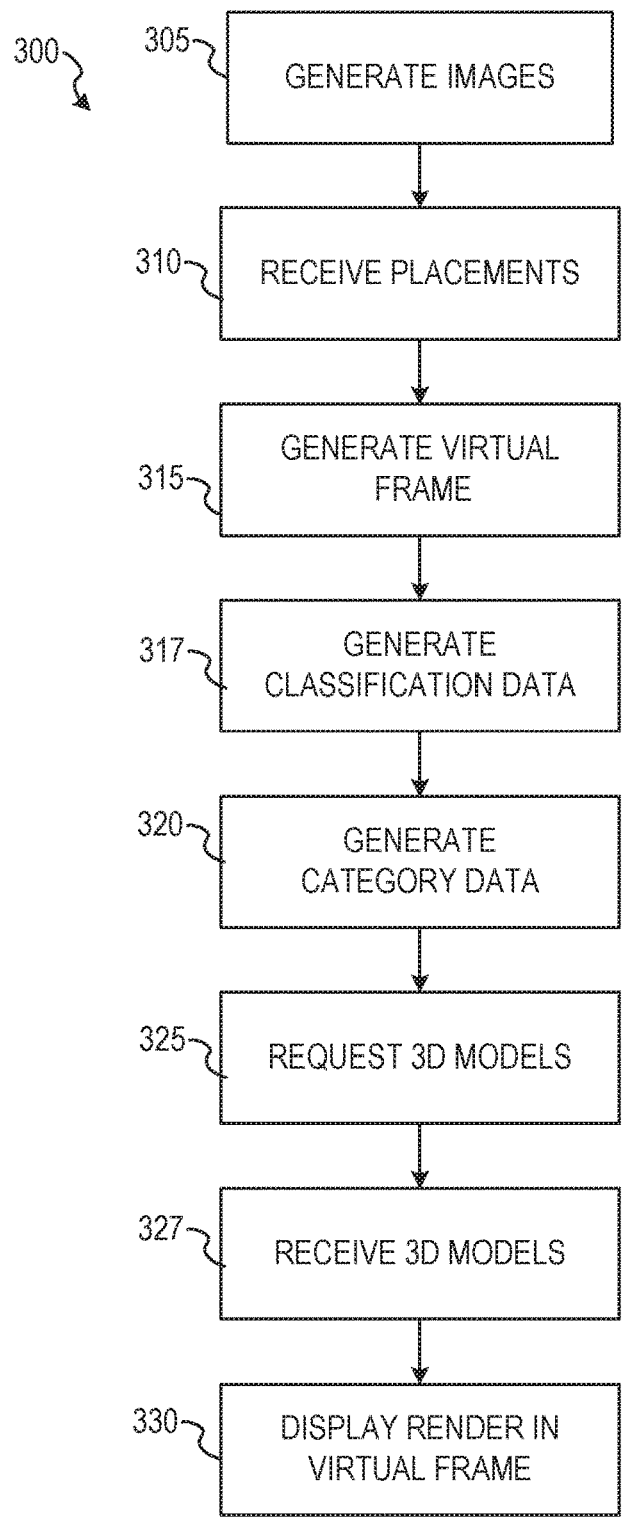
FIG. 3 shows an example flow diagram of a method for modeling a virtual object in a real-world environment using the spatial scene modeler, according to some example embodiments.

FIG. 3 shows an example flow diagram of a method 300 for modeling a virtual object in a real-world environment using the spatial scene modeler 114, according to some example embodiments. At operation 305, the image engine 210 uses an image sensor of the client device 110 to generate one or more images. For example, at operation 305, the image engine 210 may use the image sensor of the client device 110 to generate live video that is continuously updated on a display device of the client device 110.

At operation 310, the frame engine 215 receives one or more placements of virtual points from the user 106 of the client device 110. For example, at operation 310, the frame engine 215 receives gestures through a touchscreen of the client device as the client device 110 continuously displays the live video generated by the image engine 210.

At operation 315, the frame engine 215 generates a virtual frame or guide shape from the placements received at operation 310. For example, at operation 315, as the live video is continuously updated on the display device of the client device 110, the user 106 generates placements by tapping the touchscreen, as discussed in further detail below with reference to FIG. 8A-8I. As the placements are generated, the frame engine 215 constructs one or more dimensions of a virtual frame. In some example embodiments, the virtual frame generated operation 315 can have one dimension (e.g., a line), two dimensions (e.g., a parallelogram, or three dimensions (e.g. a cuboid, a rectangular cuboid) according to how many placements are received at operation 310.

At operation 317, the machine learning engine 220 generates classification data that can be used to filter which models are requested from the server support system 150. For example, at operation 317, the machine learning engine 220 generates a classification that indicates that the client device 110 is currently in a bedroom setting. As a further example, at operation 317, the machine learning engine 220 can generate a classification that indicates the client device 110 is in a bathroom of a house based on the machine learning engine 220 detecting a real-world object that is commonly found in bathrooms of houses, such as a toilet, sink, a soap dispenser, and so on.

At operation 320, the request engine 225 selects one or more categories for which 3-D model can be returned from the server support system 150 based at least in part on the classification data generated at operation 317. For example, if at operation 317 the machine learning engine 220 indicates that the client device 110 is currently in a bathroom environment, the category filter data generated by the request engine 225 at operation 320 can further limit the request sent over the network to only return 3D model data for items that are commonly found in bathrooms. In this way, network bandwidth is conserved. Further, the user 106 of the client device 110 is not forced to scroll through a myriad of options using the input/output devices of the client device 110 (e.g. viewing page after page of models, where each page can be slow to load over the network 104).

At operation 325, the request engine 225 generates a request and transmits the request for models to the server support system 150. In some example embodiments, the request generated and transmitted at operation 325 requests 3-D models of items that have real-world dimensions that fit inside the virtual shape generated at operation 315. Further, according to some example embodiments, the request generated at operation 325 further requests that 3-D models of items that are returned by the server support system 150 only include items that are specified at operation 320, (e.g., only items that are from a bathroom environment category, only items that are in an outside environment category, and so on). Responsive to the request, the server support system 150 accesses a database 126 through database server 124 to retrieve items that fit the virtual frame and are in the one or more specified categories.

At operation 327, the request engine 225 receives the requested 3-D models. In some example embodiments, at operation 327 the request engine 225 only receives a list of which items satisfy the request while the actual 3D model data is kept stored on the server side until the user 106 requests that one of the models be displayed. In this way, the larger three-dimensional model files are only sent when and if a user 106 requests that a given item be rendered in the 3D environment for display on the client device 110. Further, in some example embodiments, the list of items that satisfy the request can be accompanied by thumbnails or small-scale images that can be displayed within search results user interface. The user 106 can view and select a given thumbnail of an item and model data can then be requested and the model displayed, as discussed above.

At operation 330, the modeling engine 230 displays a depiction (e.g., a render) of one of the items integrated into the one or more images generated by the image engine 210. For example, in response to a user 106 selecting an item for display, the modeling engine 230 can use a virtual camera to render a depiction of the item from the perspective of the real-world location of the client device 110. In some example embodiments, the depiction is a three-dimensional render of the item that is modeled in a live video view displayed on the client device as part of an augmented reality display. An example of an item being modeled in a real-world live video view is shown in FIG. 8I and discussed in further detail below.

Figure 4:
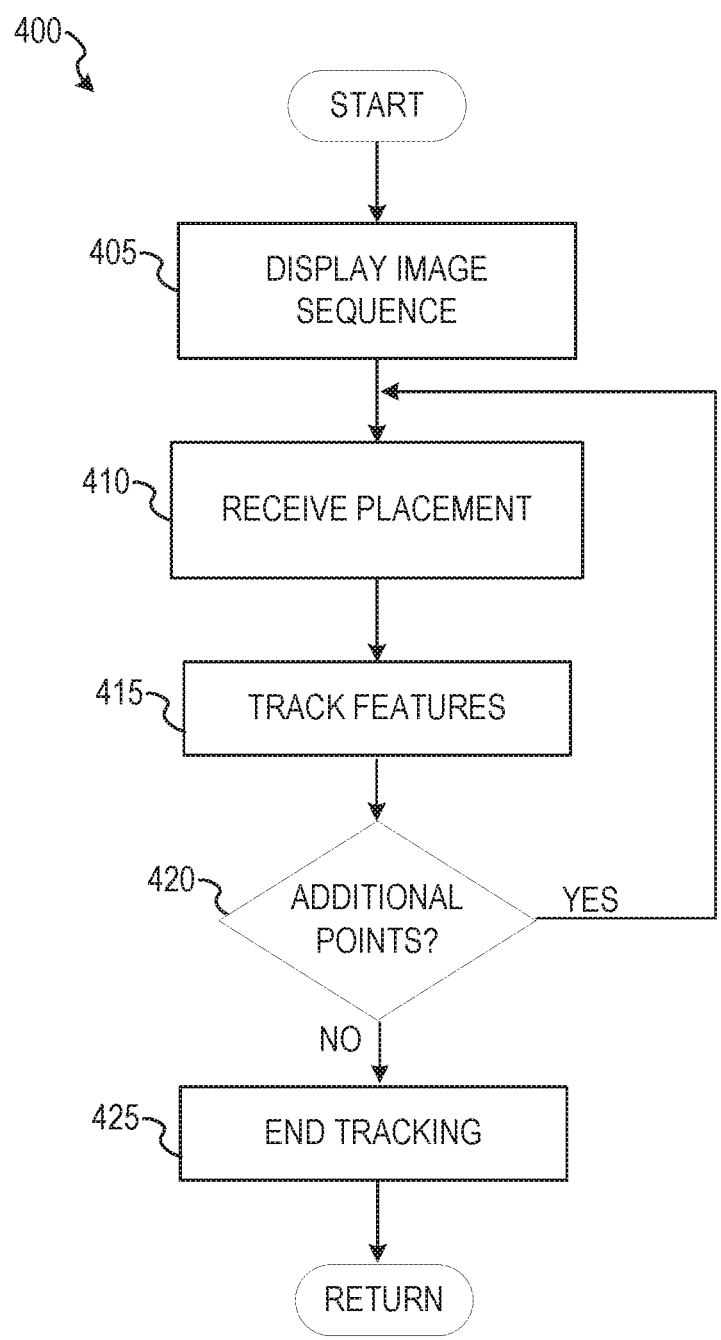
FIG. 4 shows an example flow diagram of a method for receiving placements for generating a virtual frame, according to some example embodiments.

FIG. 4 shows an example flow diagram of a method 400 for receiving placements for generating a virtual frame, according to some example embodiments. The operations of the method 400 may be configured as a subroutine of operation 310 (FIG. 3) that starts with a start block in terminates with a return block at which point data is stored in memory of the client device 110 and/or transmitted to other components of the client device 110 or server support system 150 (e.g. over the network 104).

At operation 405, the image engine 210 displays an image sequence on the display device of the client device 110. For example, at operation 405, the image engine 210 continuously updates a display of a live video feed on the client device 110. At operation 410, the frame engine 215 receives a placement from the user. For example, at operation 410, the frame engine 215 receives a tap gesture through a touchscreen of the client device 110 over a location depicting a real-world location at which the user 106 desires to place a virtual end point of the virtual frame, as discussed in further detail below with reference to FIG. 8A-8I.

At operation 415, the frame engine 215 tracks feature within the one or more images as the image engine 210 continuously updates the display of images. For example, the features can be image features such as edges, discolorations, textures, and/or blobs that the frame engine 215 can use to determine that the client device 110 is physically being moved. In some example embodiments, the frame engine 215 is configured to use tracking schemes (e.g., Scale Invariant Feature Transform (SIFT)) and inertial sensor data (e.g. accelerometer data, gyroscope data) to determine the direction and amount of movement that the client device 110 has moved. In this way, when the frame engine 215 receives additional placements, the frame engine 215 can correlate the placement of the virtual point of a virtual room to a real-world environment point and can adjust a virtual camera that can be used for object rendering accordingly At operation 420, the frame engine 250 determines whether additional placements are to be received. For example, if the user 106 has input three placements but not yet selected an end placement button, the frame engine 215 continues tracking points and loops back to operation 410 where a fourth placement is received. In response to the fourth placement the frame engine 215 ends tracking at operation 425. In some example embodiments, the frame engine 215 ends tracking of image features before a fourth placement point is received. For example, at operation 420, a user 106 may have selected and end placement button after inputting two placements (i.e., where the virtual shape to be generate is a line in one dimension).

Figure 5:
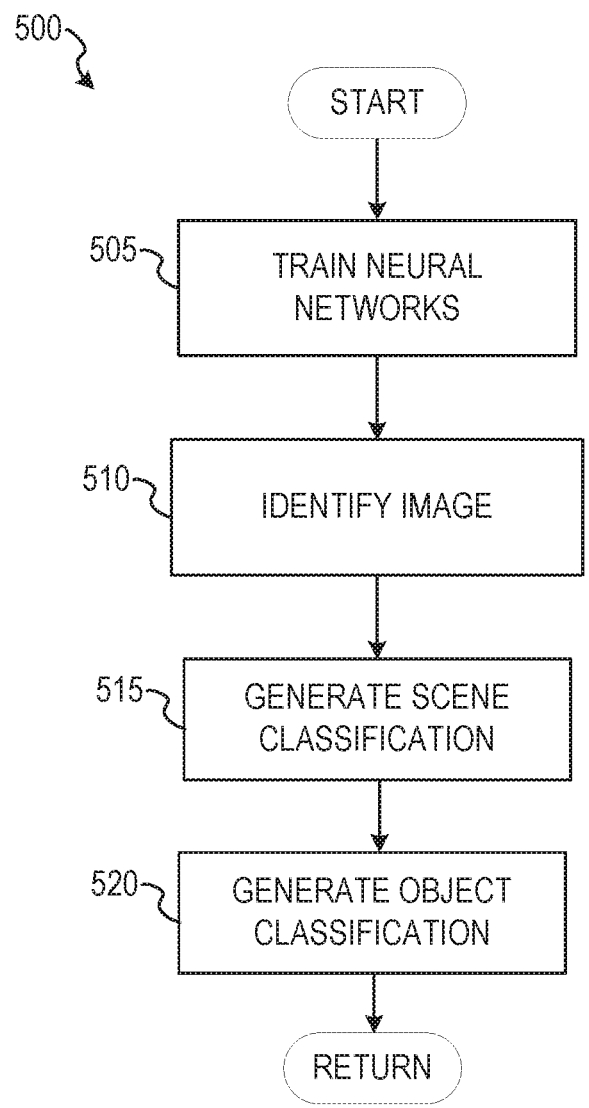
FIG. 5 shows an example flow diagram of a method for receiving placements for generating a virtual shape, according to some example embodiments.

FIG. 5 shows an example flow diagram of a method 500 for receiving placements for generating a virtual shape, according to some example embodiments. The operations of the method 500 may be configured as a subroutine of operation 317 (in FIG. 3) that starts with a start block in terminates with a return block at which point data is stored in memory of the client device 110 and/or transmitted to other components of the client device 110 or server support system 150 (e.g. over the network 104).

At operation 505, the machine learning engine 220 trains one or more neural networks. In some example embodiments, at operation 505, the machine learning engine 220 trains a first convolutional neural network to identify which real-world environment an input image is depicting (e.g., a bathroom, a bedroom, a kitchen, an outside environment). In some example embodiments, at operation 505, the machine learning engine 220 trains a second convolutional neural network to identify objects that are depicted within an image (e.g., a coffee cup, books, a table lamp, a television, food items, a toilet, a bathroom sink, a kitchen sink, a couch, other furniture items). In some example embodiments, the training of neural networks is performed on the server side, e.g., by server support system 150. In those example embodiments, instead of training the networks at operation 505, the machine learning engine 220 receives trained neural network models from the server support system 150.

At operation 510, the machine learning engine 220 identifies an image that is to be input into the neural networks. For example, at operation 510, the machine learning engine 220 samples one or more images from a live video feed that is continuously being updated on the display device of the client device 110.

At operation 515, the machine learning engine 220 generates scene classification data. For example, at operation 515, the machine learning engine 220 applies the trained first convolutional neural network to the image identified at operation 510 to generate classifications that the image is depicting a given real-world environment. One of ordinary skill in the art appreciates that the scene classification data generated at operation 515 can include a confidence or accuracy score for each type of scene in the training image set (e.g., 85% confidence that input image is depicting an outside environment, 15% confidence that the image is depicting a bedroom, and so on).

At operation 520, the machine learning engine 220 generates object classification data. For example, at operation 520, the machine learning engine 220 applies the second convolutional neural network to the image identified at operation 510 to generate a classification that the image is depicting one or more objects. One of ordinary skill in the art appreciates that the object classification data generated at operation 520 can include a confidence or accuracy score for each type of object potentially detected (e.g., 85% confidence that a region of interest (ROI) in the input image depicts a coffee mug, etc.).

Figure 6:
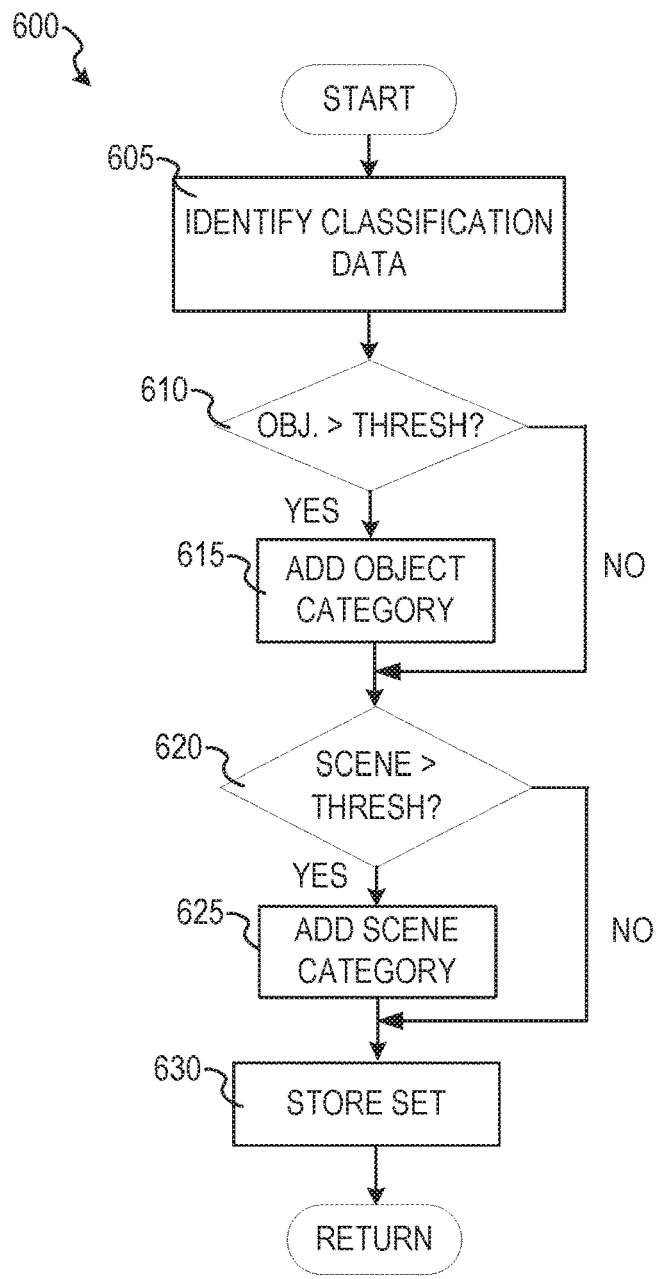
FIG. 6 shows an example flow diagram of a method for generating category filter data, according to some example embodiments.

FIG. 6 shows an example flow diagram of a method 600 for generating category filter data, according to some example embodiments. The operations of the method 600 may be configured as a subroutine of operation 320 (FIG. 3) that starts with a start block in terminates with a return block at which point data is stored in memory of the client device 110 and/or transmitted to other components of the client device 110 or server support system 150 (e.g. over the network 104).

At operation 605, the request engine 225 identifies the classification generated by the machine learning engine 220 at operation 317. At operation 610, the request engine 225 determines whether object classification scores generated by the object classification neural network are above a pre-specified threshold. If none of the object classifications are above the pre-specified threshold the method 600 continues to operation 620. On the other hand, at operation 610, if an object classification score is above the threshold than the object category to which that object belongs is added to a return category set at operation 615. For example, if threshold is 90% and a depicted object is classified as a toilet with a 95% likelihood or confidence, then the bathroom category (i.e., the category in which the toilet belongs) is added to the return category set. In some example embodiments, items of categories in the return category set can be placed higher in results user interface, as discussed in further detail below with reference to FIGS. 8E and 8F.

At operation 620, the request engine 225 determines whether any of the scene classifications satisfy a pre-specified threshold. If none of the scene classifications satisfy the threshold, the method 600 continues to operation 630. On the other hand, if at operation 620 a scene classification score satisfies the threshold, the request engine 225 adds the category of the scene classification to a return category set at operation 625. For example, if the scene neural network engine 725 generates a high likelihood that the client device is in a bedroom, a bedroom category is added to the return category set. Items in the bedroom category can be placed higher in results or otherwise emphasized in the model results user interface. At operation 630, request engine 225 stores the return category set in memory local to the client device. In some example embodiments, other categories can be added to the return category set based on other metrics. For example, if most items that fit the virtual shape are in a kitchen category, the kitchen category can be included in the results category set. This may occur where the area specified by the virtual frame is uniquely found in the certain environment. For example, if a user creates a virtual frame that has the dimensions of a kitchen drawer, silverware organizer items may constitute most of the items that fit in the specified virtual frame. In the example, silverware organizers are associated with a kitchen category, thus the kitchen environment category can be included in the return category set.

Although the example discussed above with reference to FIGS. 5 and 6 discuss an embodiment in which the machine learning engine 220 executes on the client device 110, it is appreciated that in some example embodiments the machine learning engine 220 may be integrated into the sever support system 150 and run from the application server 140. For example, after generating a virtual frame (e.g., a bounding box, bounding shape, etc.) the spatial scene modeler 114 submits a request for items to the server support system 150. The request may include one or more images sampled from a live video view displayed on the client device 110. On the server side, the machine learning engine 220 may use a machine learning scheme (e.g., a convolutional neural network, a support vector machine, random forest) to determine that the image included the request is an image of an outside environment, thereby indicating that the client device 110 is likely outside and the user of the client device seeks to simulate 3D models outside (e.g., as part of a virtual or augmented reality experience). In response to determining that the image is likely an image of an outside environment, items that fit the bounding box can be further filtered such that only outside items (e.g., patio furniture items) that fit within the bounding box are returned as results to the user.

Figure 7:
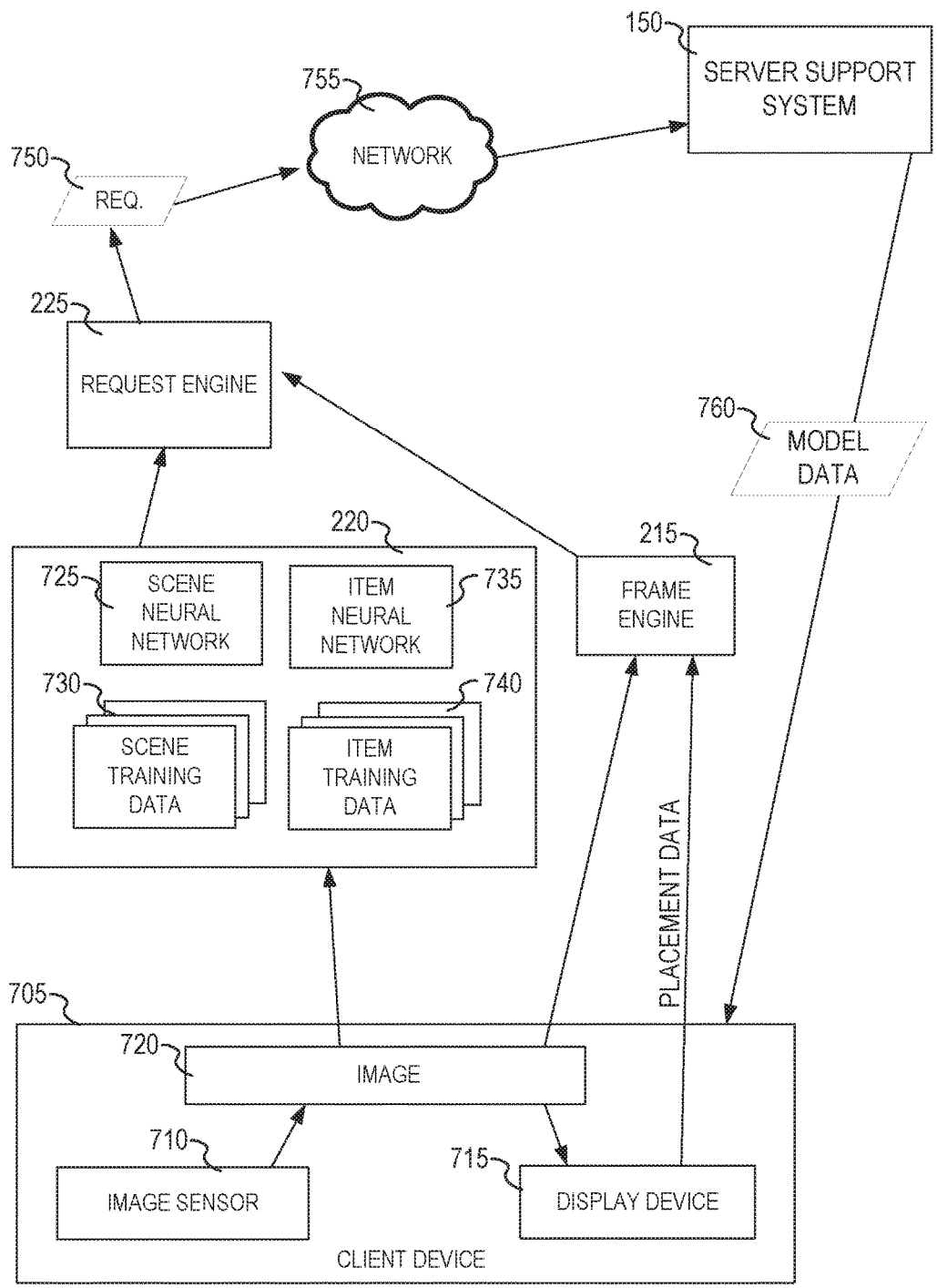
FIG. 7 shows an example network architecture for implementing a spatial scene modeler, according to some example embodiments.

FIG. 7 shows an example network architecture 700 for implementing a spatial scene modeler, according to some example embodiments. As illustrated in FIG. 7, the client device 705 can include an image sensor 710 and a display device 715. The image sensor 710 can be used to generate one or more images 720. In some example embodiments, the one or more images 720 include a live video feed which is continuously updated and displayed on the display device 715. The one or more images 720 can be input into the machine learning engine 220 for classification analysis. The one or more images 720 can also be input into the frame engine 215. As discussed above, the frame engine can generate a virtual frame from placements received by the user as the one or more images 720 are displayed on the display device 715 (e.g., tap gestures via a touchscreen display). The frame engine 215 then transmits the dimensional information of the virtual frame to the request engine 225.

The machine learning engine 220 can include scene training data 730. In some example embodiments, the scene training data 730 includes images of different real-world environments, such as bathrooms, outdoor patios, bedrooms, kitchens, etc. The machine learning engine 220 trains a convolutional neural network, such as scene neural network 725, to correctly identify scenes included in the scene training data 730. For example, the scene neural network 725 can use the image features and bright lighting to detect that an image is depicting a patio in the sunlight. As a further example, a scene neural network 725 can detect that an image is depicting a bedroom based on a lack of lighting or other features used to train the scene neural network 725 on the scene training data 730.

Further, the machine learning engine 220 can include item training data 740. In some example embodiments, the item training data 740 includes different images of physical items that are strongly correlated with a given category (e.g., a television is generally found in bedrooms and living rooms, toilets in bathrooms, etc.). What items are sufficient enough to identify a scene can be pre-associated and stored in database 126.

The machine learning engine 220 can then train another convolutional neural network, such as an object recognition neural network 735, to correctly identify objects depicted in input images as being objects in the item training data 740, as appreciated by one of ordinary skill in the art. The machine learning engine 220 then transmits the generated classification data to the request engine 225.

The request engine 225 generates a request 750 based on the classification data received from the machine learning engine 220 and the virtual frame data (e.g. dimensions of the virtual frame) received from the frame engine 215. The request 750 can be transmitted over a network 755 (e.g. the Internet) to the server support system 150 which may be hosted on one or more servers, such as application server 140. As discussed above, the server support system 150 may analyze the request to determine the dimensional data and category filtering data and return results to the client device as model data 760.

Figure 8A:
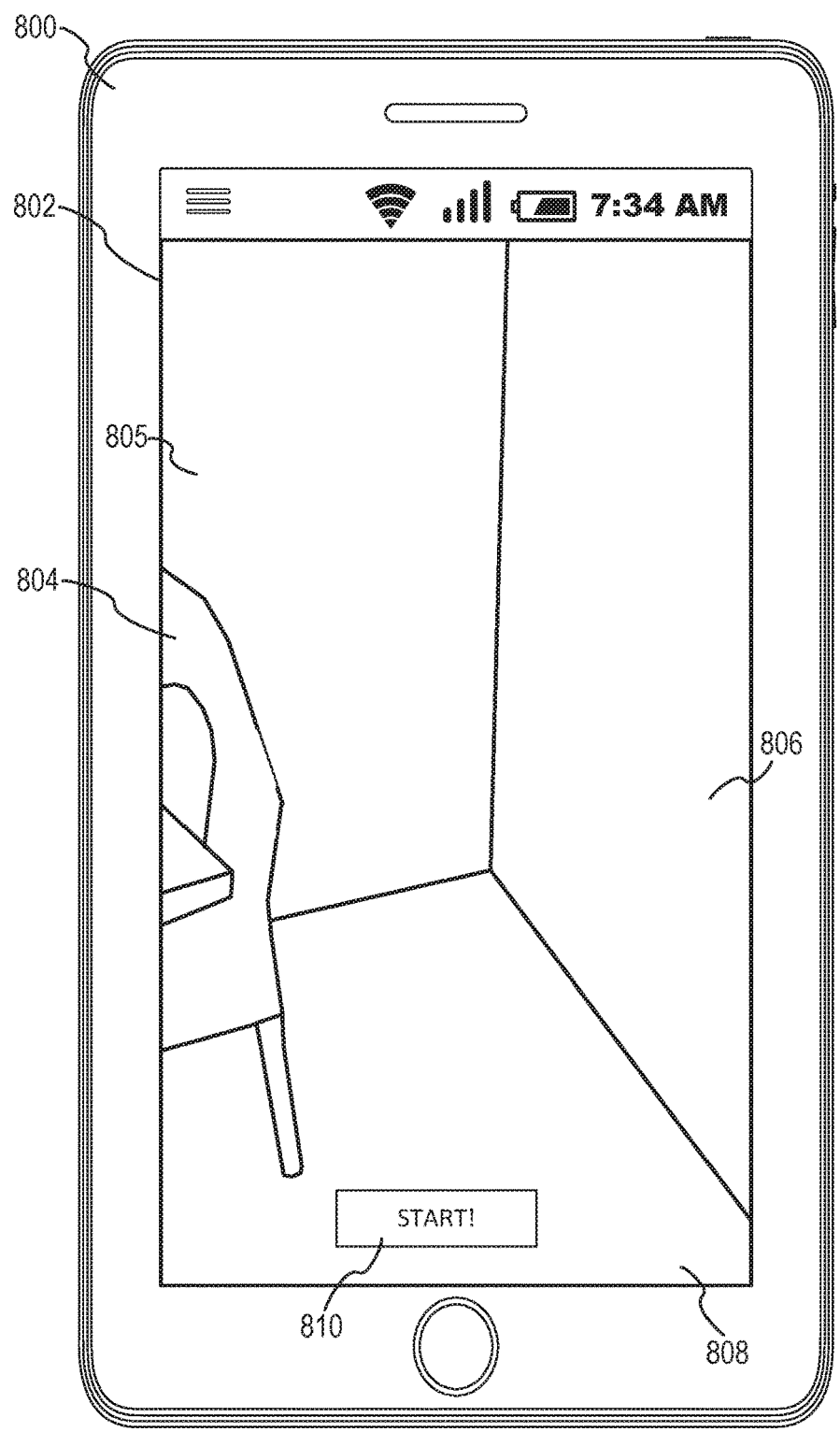
FIGS. 8A-8I show example user interfaces for implementing a spatial scene modeler, according to some example embodiments.
Figure 8B:
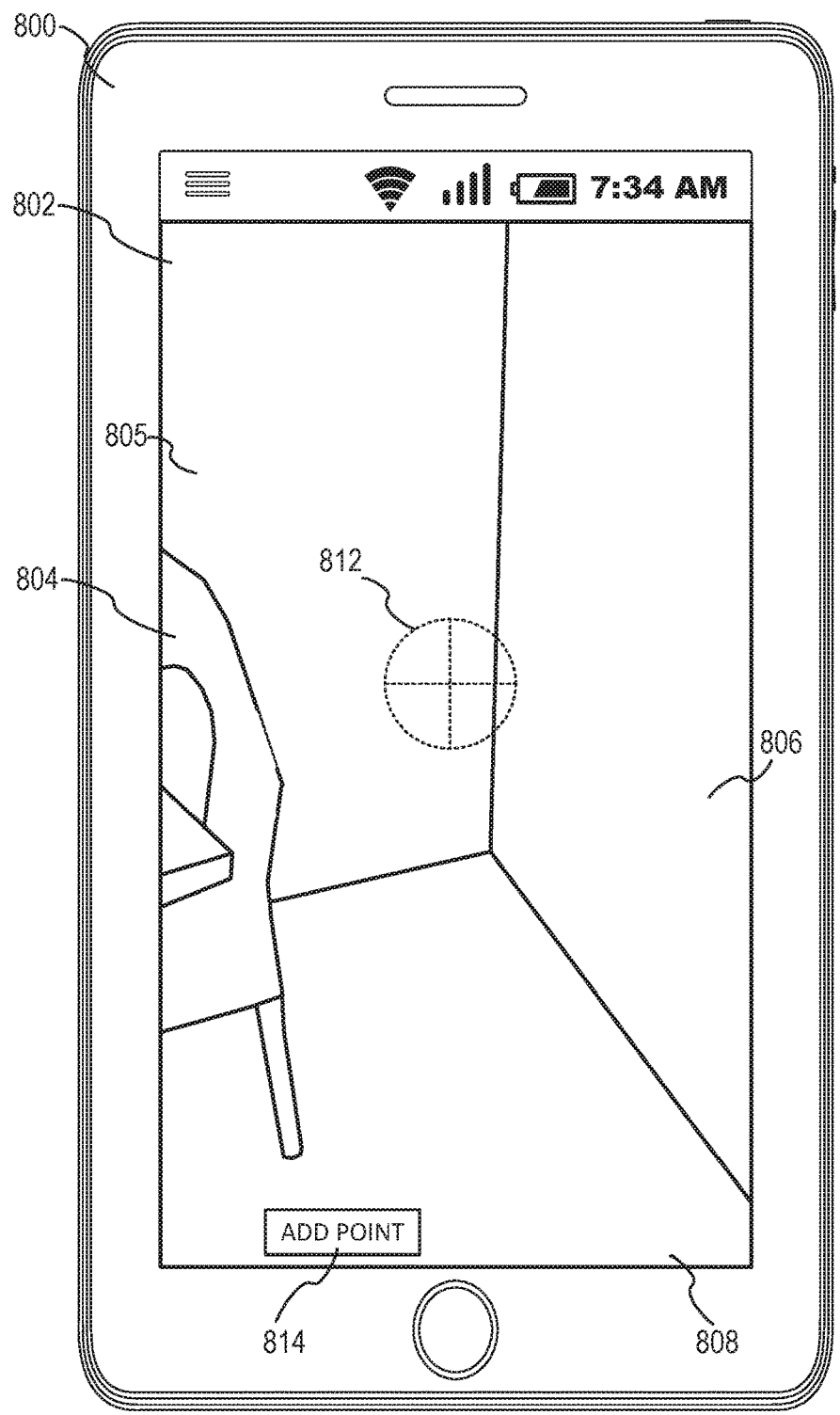
Figure 8C:
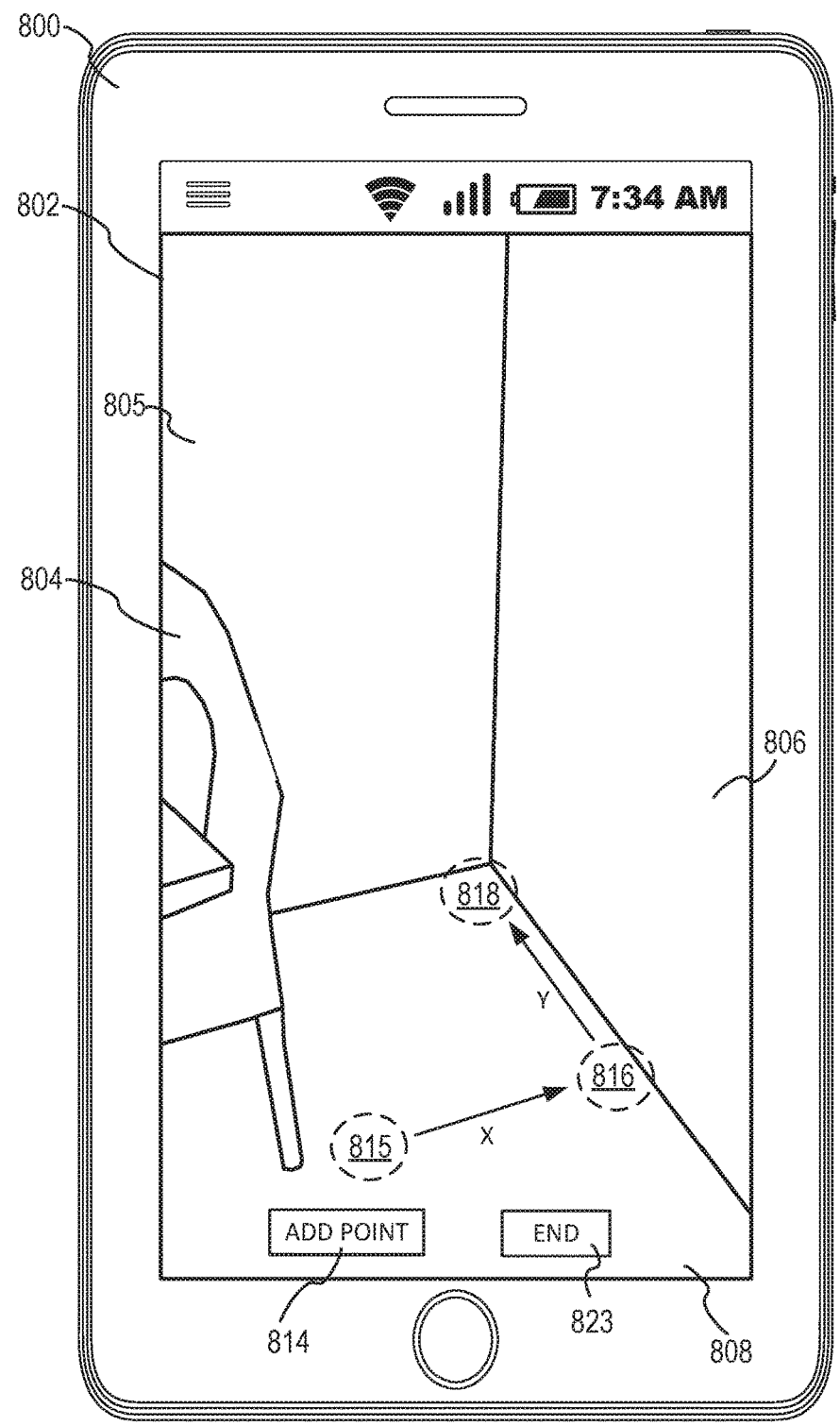
Figure 8D:
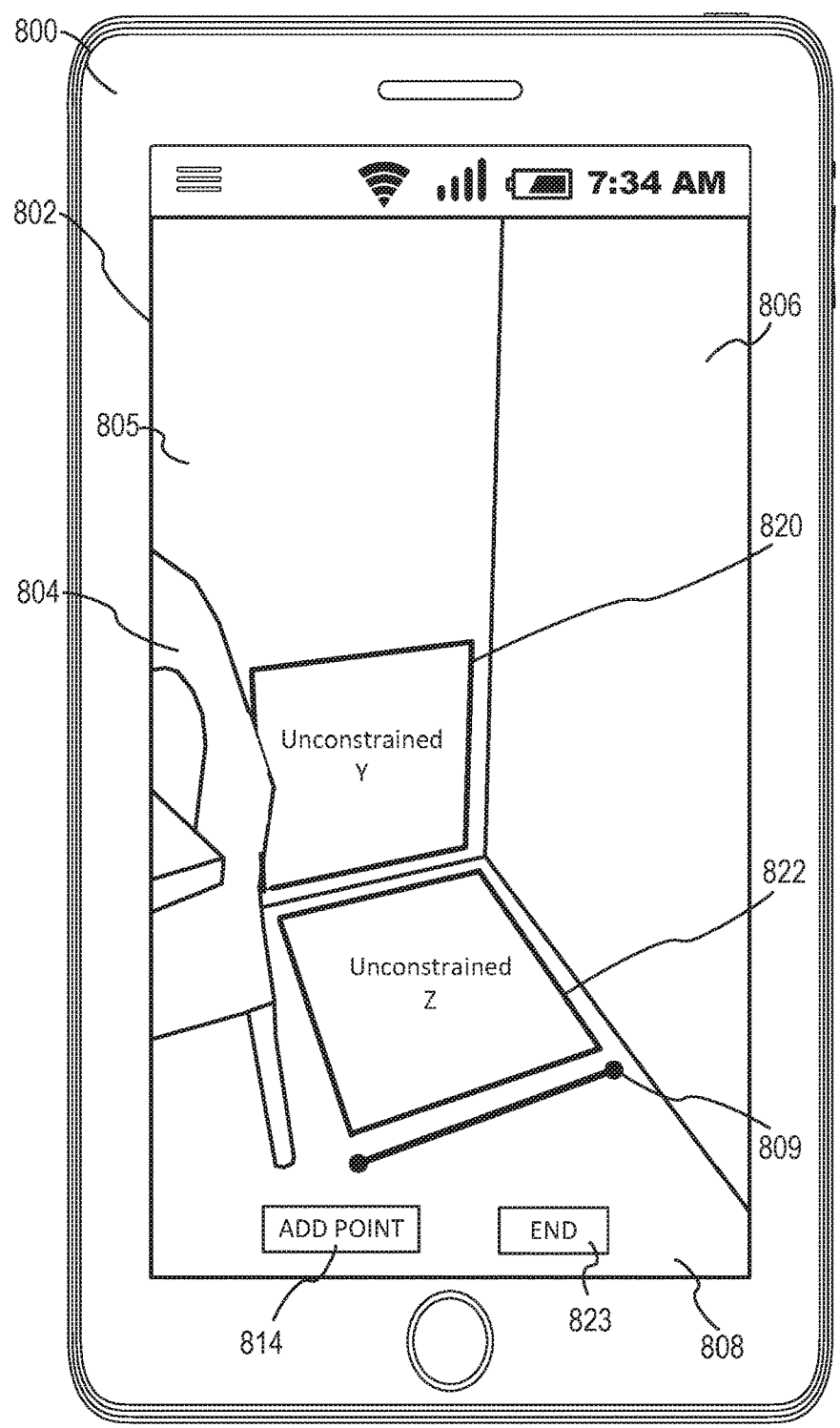
Figure 8E:
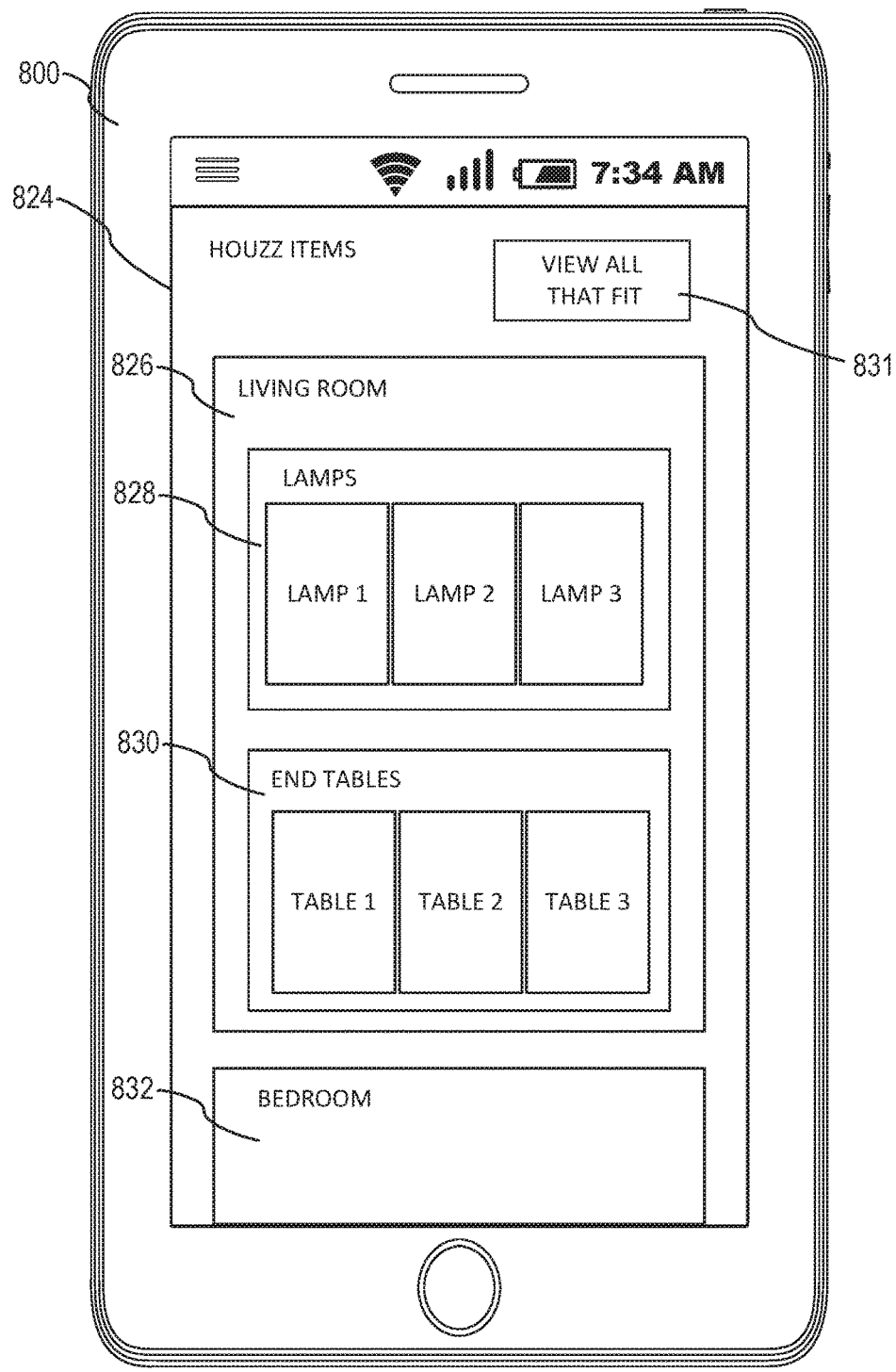
Figure 8F:
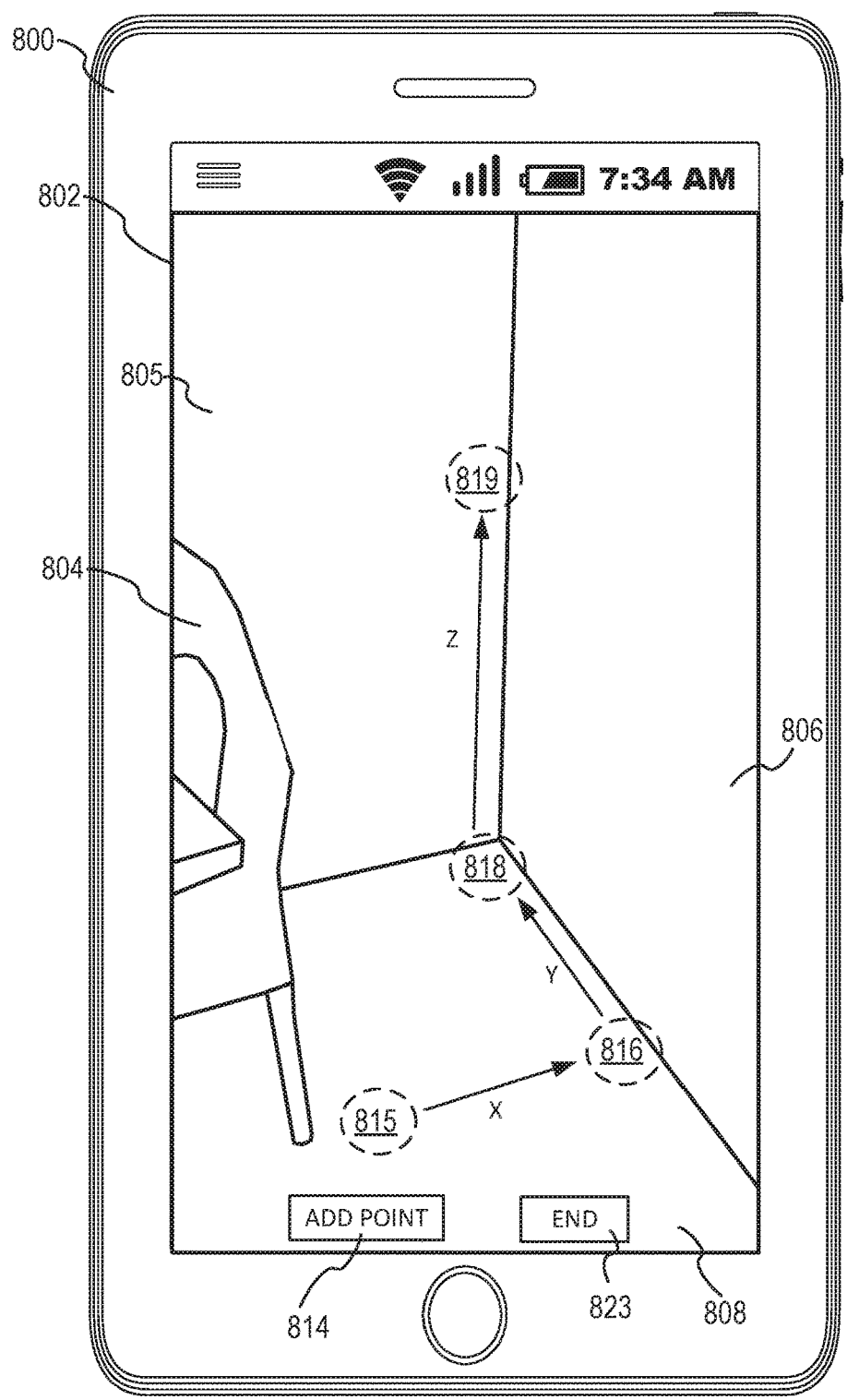
Figure 8G:
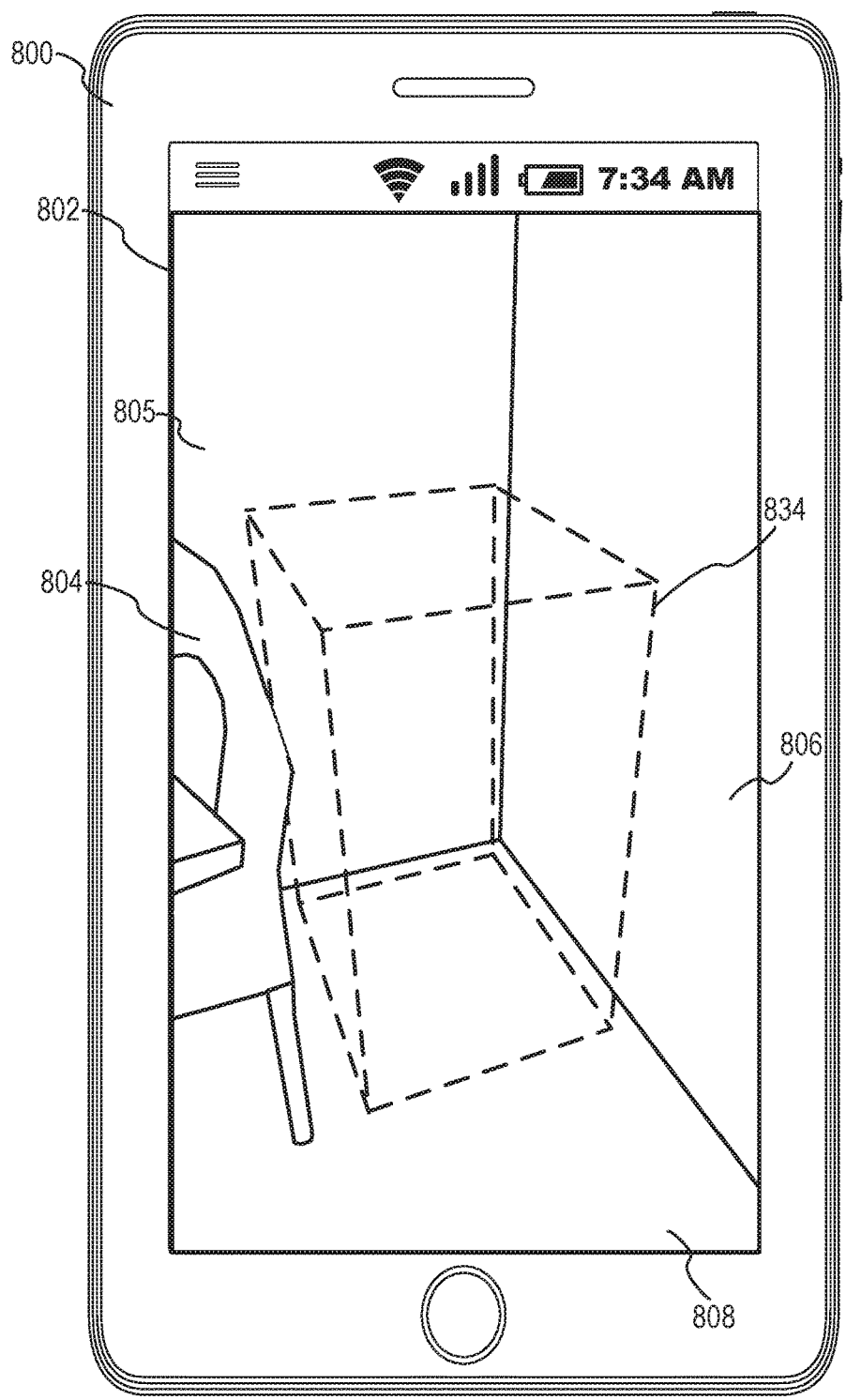
Figure 8H:
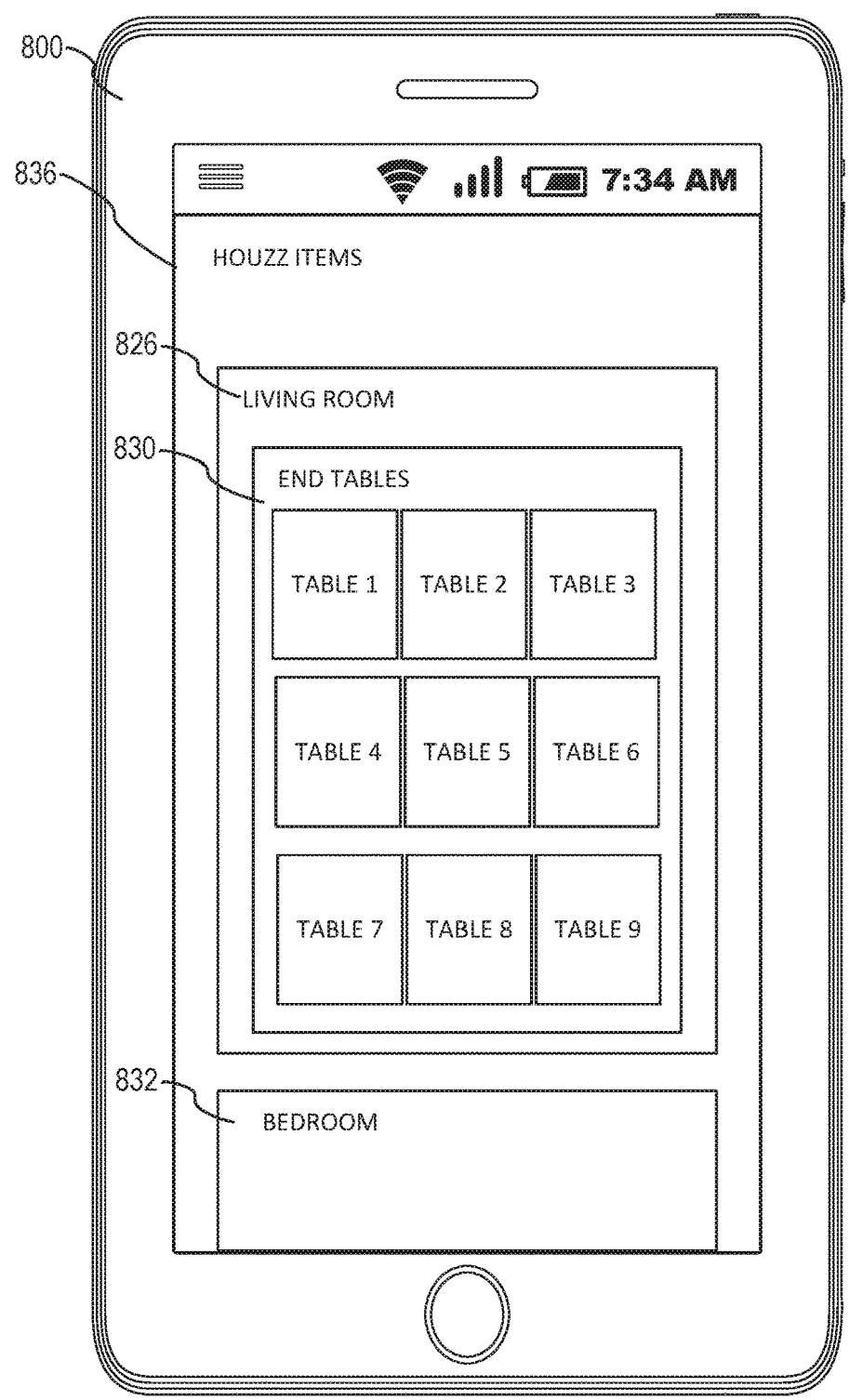
Figure 8I:
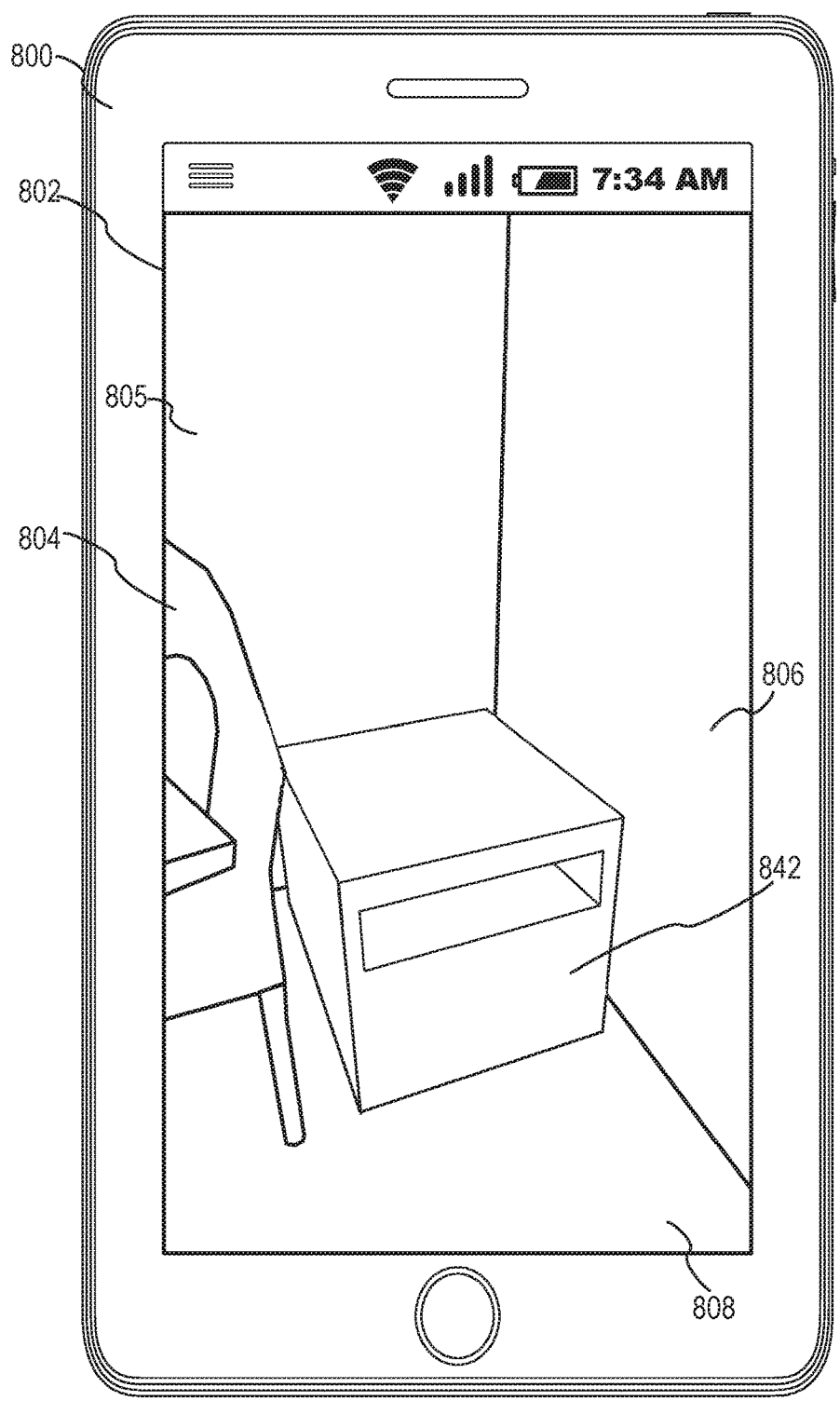

FIGS. 8A-8I show example user interfaces for implementing a spatial scene modeler 114, according to some example embodiments. FIG. 8A shows an example client device 800 (e.g. a tablet computer) displaying an image 802 of a room on a display device (e.g. a touch screen). The image 802 of the room may be a frame of a live video feed that is being continuously updated on the display device of the client device 800. As illustrated, the image 802 of the room includes a back wall 805 sidewall 806 and a ground 808. Further, the image 802 of the room depicts a chair 804 that is some distance away from the sidewall 806.

In the illustrated example, assume the user a 106 is seeking to use is the client device 800 to browse a website for furniture that fits in the space between the chair 804 and the sidewall 806. To initiate one or more of the discussed methods (e.g. method 300) the user 106 can select the start button 810. Upon the start button 810 being selected, the machine learning engine 220 can detect the type of room depicted in the image 802 using the scene neural network 725 and can further recognize the chair 804 using the object recognition neural network 735.

As illustrated in FIG. 8B, a placement guide 812 has superimposed over the image 802 to assist the user 106 add one or more placements of virtual points. In particular, for example, the user 106 can physically move the client device 800 so that the placement guide 812 is located near to the physical point at which the user seeks to begin construction of the virtual frame. To place a virtual point the user 106 can select the add point button 814.

FIG. 8C shows example placements points 815, 816, and 818. In the example illustrated in FIG. 8C, the user 106 has moved the client device 800 over or near the physical point over which placement point 815 is displayed. When the virtual guide (not depicted in FIG. 8C) is over or near the placement point 815 the user 106 can select the add point button 814. When the add point button 814 is selected the frame engine 215 generates a virtual point in a 3D room model. Each created virtual point can be used to create or delineate the virtual shape. That is, for example, placement point 815 can be one of several vertices of a rectangular cuboid virtual frame, as discussed in further detail below.

Continuing to place points, the user 106 can move the client device 800 from point 815 to placement point 816. The user 106 then again selects the add point button 814 when the client device 800 is located over near the placement point 816. If the user 106 only seeks to specify the distance between placement points 815 and 816, the user can select the end button 823.

Turning to FIG. 8D, assuming the user 106 selected the end button 823 after placement of placement point 816, the frame engine 215 has constructed a one-dimensional virtual frame 809. The example one-dimensional virtual frame 809 can then be included as a physical constraint to be included in a request for models. That is, in other words, the request can specify that only 3D models of items that have at least one real world measurement (e.g., width, height, depth) that is equal to or smaller than the length virtual frame 809 should be returned to the spatial scene modeler 114.

Users seeking to specify further dimensions of the space in which an item can be modeled can place additional points, instead of ending point placement at placement point 816. For example, returning to FIG. 8C, assume that after placing placement point 816 the user 106 did not select the end button 823 and instead further moved the client device 800 (e.g., placement guide 812) to physical point 818 and selected add point button 814. Further assume that after placing the three points, the user selects then selects the end button 823. In response to receiving the three placement points 815, 816, and 818, an example two-dimensional virtual frame 822 is generated. FIG. 8D shows an example virtual frame 822 generated from placement points 815, 816, and 818. As illustrated, virtual frame 822 is unconstrained in the Z or vertical dimension. This may be preferable in cases where a user is not concerned with the physical height of an object to be modeled between chair 804 and sidewall 806. For example, the user may seek to be model a floor lamp and different floor lamps can vary greatly in height. Other types of virtual shapes having an unconstrained one or more unconstrained dimensions can be created in a similar manner. For example, virtual frame 820 also has two dimensions specify, but is unconstrained in the y-dimension, which is in a direction orthogonal to the back wall 805.

In some example embodiments, upon the user 106 selecting the add point button 814 and then end button 823, request engine 225 automatically sends virtual frame data to the to the network server as a 3D model request. In some example embodiments, the request can further include category limitations generated by the machine learning engine 220.

Turning to FIG. 8E, in response to receiving model results from the server support system 150, the interface engine 205 generates a results user interface 824. The results user interface 824 includes a first environment category window 826 that is a living room category of items and a second environment category window 832 that is a bedroom category of items. In some example embodiments, the categories of windows 826 and 830 are the highest scoring categories as indicated by classification data generated by the machine learning engine 220, as discussed above.

The first environment category window 826 includes items that fit within the dimensions of the two-dimensional virtual frame 822, which was unconstrained in the Z or height dimension. In particular, the first environment category window 826 can include a first item category window 828 and a second item category window 830. The first item category window 828 shows thumbnails of floor lamps, which are generally taller items. The second item category window 830 shows thumbnails of end tables. The category of end tables may be pre-associated in database 126 with chairs, such that when a chair is detected by the object recognition neural network, end tables are included in user interface 824. In this way, the results displayed within the results user interface 824 are tailored to the real-world location of the client device 800, and the user 106 is not forced to scroll through myriads of results.

A user 106 may select button 831 when he/she does not see results tailored to his/her search strategy. That is, for example, the machine learning engine 220 may have incorrectly classified an image and the results may be in user interface 824 may be in accurate. In those cases, the user can override the results and see all items that fit the virtual shape by selecting button 831.

Three dimensional virtual frames can be generated by placing additional points. For example, turning to FIG. 8F, assume that after placing point 818 the user does not end the process, but instead places point 819 then selects the add point button 814 and then end 819. In response to receiving the four placement points (e.g., 815, 816, 818, and 819), the frame engine 215 automatically generates virtual frame 834 which is displayed in FIG. 8G. The virtual frame 834 is a rectangular cuboid that has finite values in all three dimensions (e.g., x/y/z, width/depth/height, etc.). Model results returned using virtual frame 834 may therefore be similar to results generated from two-dimensional virtual frame 822 (FIG. 8D) but exclude items that exceed the finite z dimension of virtual frame 834.

FIG. 8H displays a modified results user interface 836, according to some example embodiments. In the example illustrated in FIG. 8H, in response to the height dimension of the virtual frame 834 being specified, the first item category window 828 (that displayed thumbnails of floor lamps) has been removed and only second item category window 830 remains.

Each of the thumbnails displayed within the second item category window 830 is selectable by the user through the touchscreen of the client device 800. For example, turning to FIG. 8I, assuming the user 106 selects one of the thumbnails, the modeling engine 230 may request and receive a 3D model data for an end table and render the end table 842 in the image 802. As discussed, in some example embodiments, the image 802 is part of a live video view in which the item is modeled in the real-world environment of the client device 800 as part of an augmented reality display. In those example embodiments, the orientation and distance of the rendered object 842 is adjusted by the modeling engine 230 to make the object 840 appear stationary between the chair 804 and sidewall 806. For example, in response to the user 106 physically moving the client device 800, the modeling engine 230 moves a virtual camera used to render the object 842. The amount by which the virtual camera is moved is set to the amount of physical movement detected by inertial sensors (e.g., accelerometer, gyro) of the client device 110, an amount of movement detected in image features displayed in the live video feed, and combinations thereof, as is appreciated by those of ordinary skill in the art. Thus, as the client device 800 is moved, the amount and position of the chair 804 may change within the live video feed and the object 842 may likewise change due to the virtual camera position being continually updated. If the user seeks to model another item, the user may navigate back to the results user interface (e.g., results user interface 836 of FIG. 8H) and select another item to view in the augmented reality live view. In this way, a user 106 can efficiently model items in a specific space in a specific room using his/her client device, such as a tablet computer having limited screen size and input/output controls.

Figure 9:
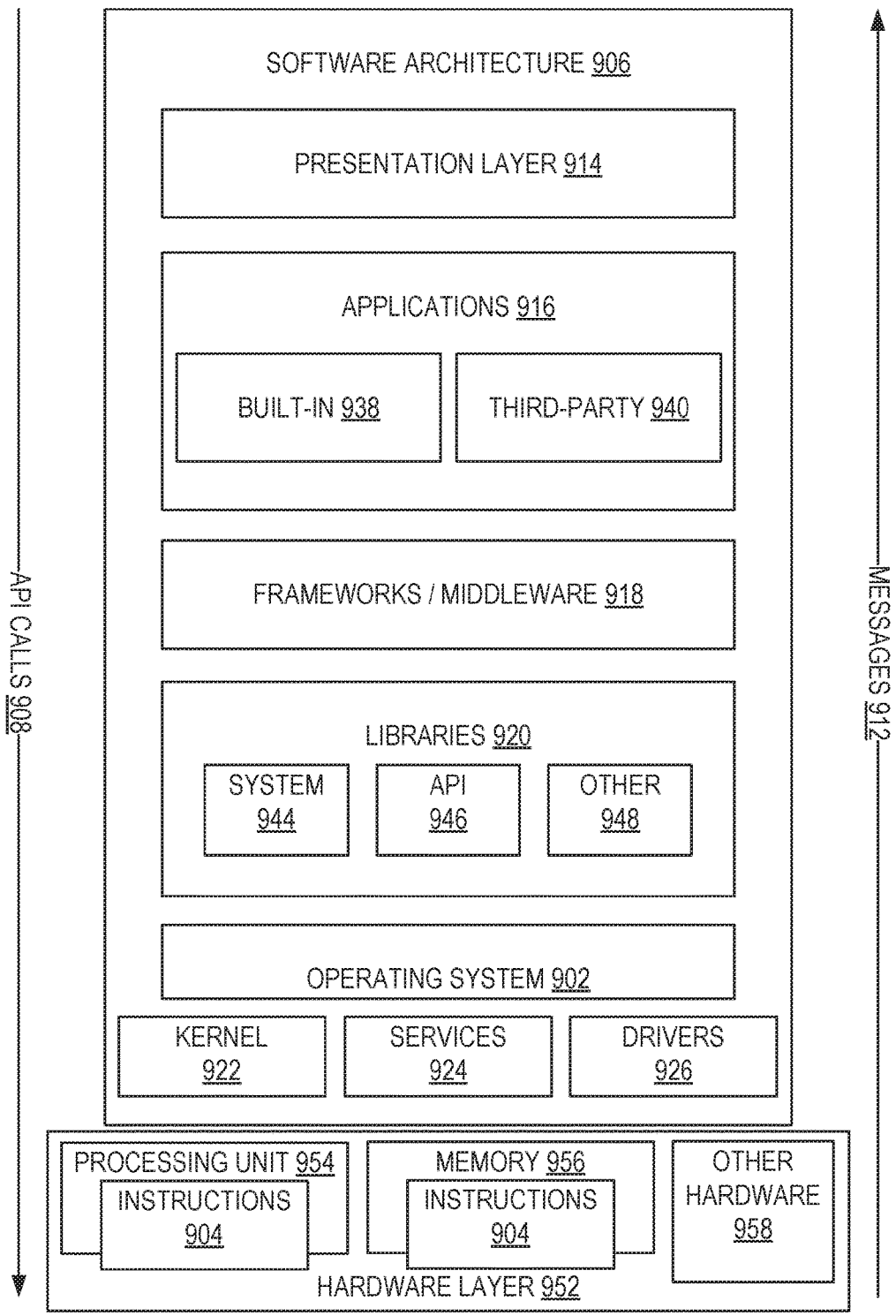
FIG. 9 is a block diagram illustrating a representative software architecture, which may be used in conjunction with various hardware architectures herein described.

FIG. 9 is a block diagram illustrating an example software architecture 906, which may be used in conjunction with various hardware architectures herein described. FIG. 9 is a non-limiting example of a software architecture, and it will be appreciated that many other architectures may be implemented to facilitate the functionality described herein. The software architecture 906 may execute on hardware such as a machine 1000 of FIG. 10 that includes, among other things, processors, memory, and I/O components. A representative hardware layer 952 is illustrated and can represent, for example, the machine 1000 of FIG. 10. The representative hardware layer 952 includes a processing unit 954 having associated executable instructions 904. The executable instructions 904 represent the executable instructions of the software architecture 906, including implementation of the methods, components, and so forth described herein. The hardware layer 952 also includes a memory/storage 956, which also has the executable instructions 904. The hardware layer 952 may also comprise other hardware 958.

In the example architecture of FIG. 9, the software architecture 906 may be conceptualized as a stack of layers where each layer provides a particular functionality. For example, the software architecture 906 may include layers such as an operating system 902, libraries 920, frameworks/middleware 918, applications 916, and a presentation layer 914. Operationally, the applications 916 and/or other components within the layers may invoke application programming interface (API) calls 908 through the software stack and receive a response in the form of messages 912. The layers illustrated are representative in nature and not all software architectures have all layers. For example, some mobile or special-purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than by interfacing directly with the underlying operating system 902 functionality (e.g., kernel 922, services 924, and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. The third-party applications 940 may include an application developed using the ANDROID™ or IOS™ software development kit (SDK) by an entity other than the vendor of the platform and may be mobile software running on a mobile operating system such as IOS™, ANDROID™, WINDOWS® Phone, or other mobile operating systems. The third-party applications 940 may invoke the API calls 908 provided by the mobile operating system (such as the operating system 902) to facilitate functionality described herein.

The applications 916 may use built-in operating system functions (e.g., kernel 922, services 924, and/or drivers 926), libraries 920, and frameworks/middleware 918 to create user interfaces to interact with users of the system. Alternatively, or additionally, in some systems, interactions with a user may occur through a presentation layer, such as the presentation layer 914. In these systems, the application/component "logic" can be separated from the aspects of the application/component that interact with a user.

Figure 10:
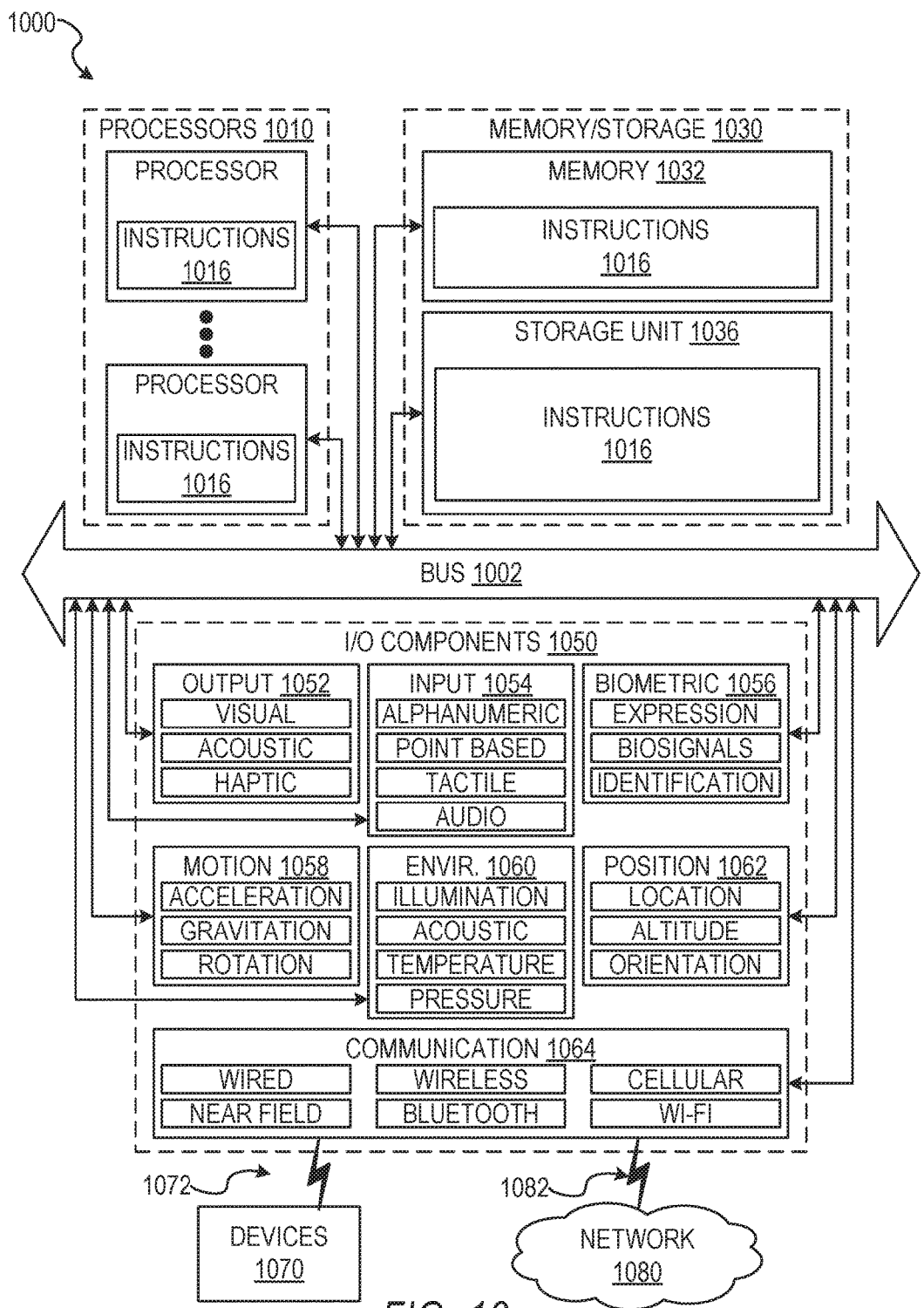
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. As such, the instructions 1016 may be used to implement modules or components described herein. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines that individually or jointly execute the instructions 1016 to perform any one or more of the methodologies discussed herein.

The machine 1000 may include processors 1010, memory/storage 1030, and I/O components 1050, which may be configured to communicate with each other such as via a bus 1002. The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

The I/O components 1050 may include a wide variety of components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environment components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environment components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072 respectively. For example, the communication components 1064 may include a network interface component or other suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF410, Ultra Code, UCC RSS-2D barcode, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1016 for execution by the machine 1000, and includes digital or analog communications signals or other intangible media to facilitate communication of such instructions 1016. Instructions 1016 may be transmitted or received over the network 1080 using a transmission medium via a network interface device and using any one of a number of well-known transfer protocols.

"CLIENT DEVICE" in this context refers to any machine 1000 that interfaces to a communications network 1080 to obtain resources from one or more server systems or other client devices. A client device 110 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1080.

"COMMUNICATIONS NETWORK" in this context refers to one or more portions of a network 1080 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1080 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 1016 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions 1016 (e.g., code) for execution by a machine 1000, such that the instructions 1016, when executed by one or more processors 1010 of the machine 1000, cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1012 or a group of processors 1010) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1000) uniquely tailored to perform the configured functions and are no longer general-purpose processors 1010. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1012 configured by software to become a special-purpose processor, the general-purpose processor 1012 may be configured as respectively different special-purpose processors (e.g., comprising different hardware components) at different times. Software accordingly configures a particular processor 1012 or processors 1010, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1010 that are temporarily configured (e.g., by software) or permanently configured to perform the relevant operations. Whether temporarily or permanently configured, such processors 1010 may constitute processor-implemented components that operate to perform one or more operations or functions described herein. As used herein, "processor-implemented component" refers to a hardware component implemented using one or more processors 1010. Similarly, the methods described herein may be at least partially processor-implemented, with a particular processor 1012 or processors 1010 being an example of hardware. For example, at least some of the operations of a method may be performed by one or more processors 1010 or processor-implemented components. Moreover, the one or more processors 1010 may also operate to support performance of the relevant operations in a "cloud computing" environment or as a "software as a service" (SaaS). For example, at least some of the operations may be performed by a group of computers (as examples of machines 1000 including processors 1010), with these operations being accessible via a network 1080 (e.g., the Internet) and via one or more appropriate interfaces (e.g., an API). The performance of certain of the operations may be distributed among the processors 1010, not only residing within a single machine 1000, but deployed across a number of machines 1000. In some example embodiments, the processors 1010 or processor-implemented components may be located in a single geographic location (e.g., within a home environment, an office environment, or a server farm). In other example embodiments, the processors 1010 or processor-implemented components may be distributed across a number of geographic locations.

"PROCESSOR" in this context refers to any circuit or virtual circuit (a physical circuit emulated by logic executing on an actual processor 1012) that manipulates data values according to control signals (e.g., "commands", "op codes", "machine code", etc.) and which produces corresponding output signals that are applied to operate a machine 1000. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1010 may further be a multi-core processor 1010 having two or more independent processors 1012, 1014 (sometimes referred to as "cores") that may execute instructions 1016 contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

What is claimed is:

1. A method comprising:
    displaying, on a display device of a client device, an image sequence depicting a real-world environment, the image sequence generated using an image sensor of the client device;
    generating, on the client device, a virtual frame in a three-dimensional (3D) model of a room, the virtual frame created by receiving placements, via inputs to the display device, of multiple virtual points in the image sequence as the image sequence is displayed on the display device, the multiple virtual points being endpoints of one or more virtual dimensions of the virtual frame, the virtual frame being a two-dimensional parallelogram having a defined first dimension, a defined second dimension, and an undefined third dimension;
    transmitting, to a networked server, a request specifying 3D models of items that have first dimension values that fit the defined first dimension and that have second dimension values that fit the defined second dimension of the virtual frame generated on the client device;
    displaying, on a user interface of the display device, a plurality of items matching the defined first dimension and the defined second dimension and have various third dimension values due to the undefined third dimension of the virtual frame; and
    in response to a selection of an item of the plurality of items, displaying, on the display device, a modified image sequence that shows the image sequence and one or more renders of the selected item, the one or more renders being renders of a 3D model of the selected item as arranged at the virtual frame in the 3D model of the room.

2. The method of claim 1, further comprising:
    generating, on the client device, an environment category for the real-world environment by applying one or more convolutional neural networks to the image sequence, the one or more convolutional neural networks trained on image features in real-world images.

3. The method of claim 2, wherein the request to the networked server further specifies 3D models of items that match the environment category.

4. The method of claim 2, wherein the environment category is from a plurality of environment categories that describe different types of environments, and wherein the real-world images are images of the different types of environments.

5. The method of claim 4, wherein the different types of environments include one or more of: bedroom, bathroom, kitchen, living room, or outside.

6. The method of claim 4, wherein the one or more convolutional neural networks is an object recognition neural network, and the image features are images of real-world items.

7. The method of claim 6, wherein generating the environment category comprises:
identifying, using the one or more convolutional neural networks, a real-world item depicted in the image sequence; and
determining the environment category based on the identified real-world item being pre-associated with the environment category.

8. The method of claim 1, wherein the defined first dimension is a fixed height data value generated from placing some of the multiple virtual points of the virtual frame, and the defined second dimension is a fixed width data value generated from placing some of the multiple virtual points of the virtual frame, and the undefined third dimension is a height dimension.

9. The method of claim 3, wherein the one or more convolutional neural networks generates a plurality of environment categories including the environment category; and wherein the environment category is selected based on meeting a pre-specified threshold.

10. The method of claim 9, further comprising:
identifying additional environment categories that meet the pre-specified threshold, wherein the request further specifies 3D models of items that match the additional environment categories.

11. The method of claim 1, wherein the client device is a mobile client device and the display device substantially fills one side of the mobile client device.

12. A system comprising:
one or more processors of a machine;
an image sensor;
a display device; and
a memory storing instructions that, when executed by the one or more processors, cause the machine to perform operations comprising:
displaying, on the display device, an image sequence depicting a real-world environment, the image sequence generated using the image sensor;
generating a virtual frame in a three-dimensional (3D) model of a room, the virtual frame created by receiving placements, via inputs to the display device, of multiple virtual points in the image sequence as the image sequence is displayed on the display device, the multiple virtual points being endpoints of one or more virtual dimensions of the virtual frame, the virtual frame being a two-dimensional parallelogram having a defined first dimension, a defined second dimension, and an undefined third dimension;
transmitting, to a networked server, a request specifying 3D models of items that have first dimension values that fit the defined first dimension and that have second dimension values that fit the defined second dimension of the virtual frame;
displaying, on a user interface in the display device, a plurality of items matching the defined first dimension and the defined second dimension and have various third dimension values due to the undefined third dimension of the virtual frame;
in response to a selection of an item of the plurality of items, displaying, on the display device, a modified image sequence that shows the image sequence and one or more renders of the selected item, the one or more renders being renders of a 3D model of the selected item as arranged at the virtual frame in the 3D model of the room.

13. The system of claim 12, the operations further comprising:
generating an environment category for the real-world environment by applying one or more convolutional neural networks to the image sequence, the one or more convolutional neural networks trained on image features in real-world images.

14. The system of claim 13, wherein the request to the networked server further specifies 3D models of items that match the environment category.

15. The system of claim 13, wherein the environment category is from a plurality of environment categories that describe different types of environments, and wherein the real-world images are images of the different types of environments.

16. A non-transitory machine-readable storage medium embodying instructions that, when executed by a machine, cause the machine to perform operations comprising:
displaying, on a display device, an image sequence depicting a real-world environment, the image sequence generated using an image sensor;
generating a virtual frame in a three-dimensional (3D) model of a room, the virtual frame created by receiving placements, via inputs to the display device, of multiple virtual points in the image sequence as the image sequence is displayed on the display device, the multiple virtual points being endpoints of one or more virtual dimensions of the virtual frame, the virtual frame being a two-dimensional parallelogram having a defined first dimension, a defined second dimension, and an undefined third dimension;
transmitting, to a networked server, a request specifying 3D models of items that have first dimension values that fit the defined first dimension and that have second dimension values that fit the defined second dimension of the virtual frame;
displaying, on a user interface in the display device, a plurality of items matching the defined first dimension and the defined second dimension and have various third dimension values due to the undefined third dimension of the virtual frame;
in response to a selection of an item of the plurality of items, displaying, on the display device, a modified image sequence that shows the image sequence and one or more renders of the selected item, the one or more renders being renders of a 3D model of the selected item as arranged at the virtual frame in the 3D model of the room.

17. The non-transitory machine-readable storage medium of claim 16, the operations further comprising:
generating an environment category for the real-world environment by applying one or more convolution neural networks to the image sequence, the one or more he convolutional neural networks trained on image features in real-world images.

* * * * *